(12) United States Patent
Zhou et al.

(10) Patent No.: US 11,833,760 B2
(45) Date of Patent: Dec. 5, 2023

(54) LASER CONFORMAL MANUFACTURING METHOD OF FLEXIBLE SENSOR

(71) Applicant: Xiamen University, Fujian (CN)

(72) Inventors: Wei Zhou, Fujian (CN); Rui Chen, Fujian (CN); Xinning Zhu, Fujian (CN); Tao Luo, Fujian (CN); Weisong Ling, Fujian (CN); Chiqian Xiao, Fujian (CN)

(73) Assignee: Xiamen University, Fujian (CN)

( * ) Notice: Subject to any disclaimer, the term of this patent is extended or adjusted under 35 U.S.C. 154(b) by 0 days.

(21) Appl. No.: 18/109,529

(22) Filed: Feb. 14, 2023

(65) Prior Publication Data
US 2023/0202113 A1 Jun. 29, 2023

Related U.S. Application Data

(63) Continuation of application No. PCT/CN2022/005096, filed on Jul. 12, 2022.

(30) Foreign Application Priority Data

Sep. 22, 2021 (CN) .......................... 202111112967.5

(51) Int. Cl.
*B29C 64/386* (2017.01)
*B23K 26/046* (2014.01)
(Continued)

(52) U.S. Cl.
CPC .......... *B29C 64/386* (2017.08); *B23K 26/046* (2013.01); *B23K 26/359* (2015.10); *B23K 37/0417* (2013.01); *B33Y 50/02* (2014.12)

(58) Field of Classification Search
CPC .......... B29C 64/106–112; B29C 64/124–135; B29C 64/386–393; B29C 64/245;
(Continued)

(56) References Cited

U.S. PATENT DOCUMENTS

2002/0047229 A1* 4/2002 Yanagisawa ............ B29C 41/20
264/401
2013/0079693 A1* 3/2013 Ranky ..................... G01L 1/142
73/865.8
(Continued)

FOREIGN PATENT DOCUMENTS

| CN | 107024837 A | 8/2017 |
| CN | 108538755 A | 9/2018 |

(Continued)

OTHER PUBLICATIONS

Honging Cai et al, Utilization of Resist Stencil Lithography for Multidimensional Fabrication on a Curved Surface, ACS Nano 2018, 12, 9, 9626-9632, Sep. 6, 2018, https://doi.org/10.1021/acsnano.8b06534 (Year: 2018).*

(Continued)

*Primary Examiner* — Matthew J Daniels
*Assistant Examiner* — Andrew L Swanson
(74) *Attorney, Agent, or Firm* — COOPER LEGAL GROUP, LLC

(57) ABSTRACT

A laser conformal manufacturing method of a flexible sensor comprises: obtaining morphology data of a curved surface, and constructing a Standard Triangle Language (STL) model of the curved surface; introducing into a 3D modeling software, and combining the curved surface with a clamper holder; manufacturing to obtain the clamper with the curved surface; coating material to be manufactured on a 3D curved surface of the clamper with the curved surface; positioning to a processing platform of a laser device; constructing a model of a pattern to be manufactured by laser based on the STL model of the curved surface, and constructing an STL model or a dwg model of the pattern to be manufactured; introducing into the laser device, turning on the laser device, and running a 3D dynamic focus system; repeating the steps 4-8, and stripping the flexible sensor from the 3D curved surface.

10 Claims, 3 Drawing Sheets

(51) Int. Cl.
  *B33Y 50/02* (2015.01)
  *B23K 26/359* (2014.01)
  *B23K 37/04* (2006.01)

(58) Field of Classification Search
  CPC ......... B33Y 50/00; B33Y 50/02; B33Y 10/00;
                     B33Y 30/00; B33Y 99/00
  See application file for complete search history.

(56) References Cited

U.S. PATENT DOCUMENTS

| | | | |
|---|---|---|---|
| 2015/0042755 A1* | 2/2015 | Wang | B29C 64/386 348/46 |
| 2019/0072439 A1* | 3/2019 | McAlpine | G01L 5/228 |
| 2020/0352678 A1 | 11/2020 | Yuan et al. | |
| 2021/0076503 A1* | 3/2021 | Huang | B29C 64/379 |

FOREIGN PATENT DOCUMENTS

| | | |
|---|---|---|
| CN | 108555464 A | 9/2018 |
| CN | 112895433 A | 6/2021 |
| CN | 113049167 A | 6/2021 |
| CN | 113843498 A | 12/2021 |
| KR | 20170010291 A | 1/2017 |

OTHER PUBLICATIONS

Corresponding Chinese Patent Application No. 202111112967.5, First Office Action, dated Apr. 15, 2022.
Corresponding Chinese Patent Application No. 202111112967.5, Notification to Grant Patent, dated May 10, 2022.
Zhao, Yong, et al., "Researh on the complex surface laser measurement and 3D reconstruction", Optical Technique, Mar. 2002, pp. 172-173, vol. 28, No. 2. English Abstract.

* cited by examiner

LASER CONFORMAL MANUFACTURING METHOD OF FLEXIBLE SENSOR

RELATED APPLICATIONS

This application is a continuation of International Patent Application PCT/CN2022/105096, filed on Jul. 12, 2022, which claims priority to Chinese Patent Application 202111112967.5, filed on Sep. 22, 2021. International Patent Application PCT/CN2022/105096 and Chinese Patent Application 202111112967.5 are incorporated herein by reference.

FIELD OF THE DISCLOSURE

The present disclosure relates to a manufacturing technology of a flexible sensor, and in particular relates to a laser conformal manufacturing method of the flexible sensor.

BACKGROUND OF THE DISCLOSURE

Various manufacturing techniques, such as a microelectromechanical system (MEMS), reactive ion etching, chemical vapor deposition, nanoimprint lithography, soft lithography, etc. have been widely used for manufacturing flexible sensors on a two dimensional (2D) plane substrate. The various manufacturing techniques cannot be directly used for conformal manufacturing of the flexible sensors on a three dimensional (3D) curved surface due to specific manufacturing technology needs of the 3D curved surface. However, with the rapid development of flexible electronic devices, there is an increasing requirement for flexible sensors that are bendable and deformable. In recent years, researchers have used various flexible tensile nanomaterial and a composite material of the flexible tensile nanomaterial to look for a manufacturing method for the flexible sensors that result in the flexible sensors having strong tensile performance. For example, a 2D plane sensor is directly attached to the 3D curved surface. However, perfect attachment cannot be achieved due to different curvatures, thus limiting a practical application of the flexible sensors.

In order to attach the flexible sensors to the 3D curved surface as perfectly as possible, most of the researchers use transfer printing technology. Specifically, curvatures of 3D patterns of the 3D curved surface are analyzed using a topological method and a conformal mapping theory, and the 3D patterns are split into multiple 2D patterns. The multiple 2D patterns are separately made on 2D planes and are then spliced to the 3D curved surfaces to achieve a 3D attachment. The foregoing technology is cumbersome and time-consuming, some of the 3D patterns cannot be split into 2D patterns, and an adaptability of the 3D curved surface has technical limitations. At the same time, a process for splicing the 2D planes into the 3D curved surface easily causes a decrease of a precision of the flexible sensor. Therefore, the existing manufacturing method needs to be improved in processing efficiency, processing precision, and the adaptability of the 3D curved surface.

BRIEF SUMMARY OF THE DISCLOSURE

In order to solve the deficiencies of the existing techniques, the present disclosure provides a laser conformal manufacturing method of a flexible sensor. A new in situ laser conformal manufacturing method of nanomaterial and a composite material of the nanomaterial on a 3D curved surface is provided. Laser manufacturing is directly performed on the 3D curved surface for attaching to the flexible sensor, conformal manufacturing of a flexible functional material structure and a micro-nano functional structure on the 3D curved surface is completed using a laser 3D dynamic focus system, and conformal manufacturing of the flexible sensor with a specific sensory function on the 3D curved surface are finally completed, thus well adapting to the 3D curved surface to be attached to the flexible sensor.

In order to achieve the laser conformal manufacturing method of the flexible sensor, a technical solution of the present disclosure is as follows.

step 1: scanning a curved surface to be attached to the flexible sensor with a three dimensional (3D) scanner to obtain morphology data of the curved surface, and constructing a Standard Triangle Language (STL) model of the curved surface;

step 2: introducing the STL model of the curved surface in the step 1 into a 3D modeling software, and combining the curved surface with a clamper holder to establish an STL model of a clamper with the curved surface;

step 3: manufacturing the STL model of the clamper with the curved surface in the step 2 by a molding technology (e.g., a rapid molding technology) to obtain the clamper with the curved surface;

step 4: coating material to be manufactured on a section to be manufactured of a 3D curved surface of the clamper with the curved surface in the step 3;

step 5: positioning the clamper with the curved surface coated with the material to be manufactured in the step 4 to a processing platform of a laser device;

step 6: constructing a model of a pattern to be manufactured by laser using a 3D modeling software or a computer-aided design (CAD) software based on the STL model of the curved surface in the step 1, and constructing an STL model or a dwg model of the pattern to be manufactured;

step 7: introducing the STL model or the dwg model of the pattern to be manufactured in the step 6 into the laser device, and setting parameters of the laser device;

step 8: turning on the laser device, and running a 3D dynamic focus system;

step 9: repeating the steps 4-8 to complete a manufacturing of a flexible substrate layer and a flexible functional material layer of the flexible sensor according to a structural design of the flexible sensor; and step 10: stripping the flexible sensor from the 3D curved surface for subsequent steps after the flexible substrate layer and the flexible functional material layer of the flexible sensor are complete, constructing the STL model using the 3D modeling software, for example, Pro/E, Solidworks, 3DMax, or UG, placing the 3D curved surface above the clamper holder, enabling the section to be manufactured of the 3D curved surface to face upward, and constructing a connection structure to enable the 3D curved surface and the clamper holder to define an integral structure.

In a preferred embodiment, the molding technology in the step 3 is a 3D printing (3DP) technology, a fused deposition modeling (FDM) technology, a stereo lithography appearance (SLA) technology, a selective laser sintering (SLS) technology, a digital light processing (DLP) technology, an ultraviolet (UV) molding technology, etc.

In a preferred embodiment, the material to be manufactured is a nanomaterial and a composite material of the nanomaterial and functions as the flexible substrate layer and the flexible functional material layer of the flexible sensor, and coating the material to be manufactured on the 3D curved surface, wherein a curvature of a shape obtained by solidification of the material to be manufactured is consistent with the 3D curved surface to achieve laser conformal manufacturing of a structure of the sensor.

In a preferred embodiment, a number of layers of the flexible functional material layer is more than 1, a number of actual layers relates to the structure of the sensor.

In a preferred embodiment, the nanomaterial is a carbon-based material, a quantum dot material, transition metal carbide/nitride (MXene), a perovskite material, fullerene, metal-organic framework (MOF), a metal nanomaterial, etc., the composite material is a high molecular polymer, which can be, for example, polydimethyl siloxane (PDMS), polymethyl methacrylate (PMMA), silicone rubber (Ecoflex), or polycarbonate (PC), etc., and a coating method for coating the material to be manufactured is an immersion coating method, a brush coating method, or a spray coating method.

In a preferred embodiment, the clamper with the curved surface has an orientation-labeling point.

In a preferred embodiment, the STL model or the dwg model of the pattern to be manufactured can be a 3D surface pattern or a 3D stereo pattern, and a curvature of the pattern to be manufactured is consistent with the 3D curved surface to achieve laser conformal manufacturing of the pattern to be manufactured.

In a preferred embodiment, the laser device comprises a laser, a vibration mirror, a beam expander, and other elements.

In a preferred embodiment, the vibration mirror is a 3D dynamic focus vibration mirror.

In a preferred embodiment, adjusting a focal length of the 3D dynamic focus vibration mirror according to a distance from an object surface to be manufactured to the 3D dynamic focus vibration mirror, thereby controlling focuses of the 3D dynamic focus vibration mirror to all fall on the object surface to be manufactured to achieve focus positive manufacturing in different paths by changing the focal length of the 3D dynamic focus vibration mirror.

Compared with the existing techniques, the technical solution has the following advantages.

The laser conformal manufacturing method of the 3D curved surface for the flexible sensor of the present disclosure comprises: obtaining the morphology data of the curved surface to be attached to the sensor (i.e., the 3D curved surface to be manufactured), and constructing the STL model of the 3D curved surface; introducing the STL model of the 3D curved surface into the 3D modeling software, and combining the 3D curved surface to the clamper holder to establish the STL model of the clamper; manufacturing the STL model of the clamper by the rapid molding technology to obtain the clamper with the curved surface; coating material to be manufactured on a 3D curved surface section to be manufactured of the clamper; positioning the clamper coated with the material to be manufactured to the processing platform of the laser device; constructing the model (e.g., a CAD model or an STL model) of the pattern to be manufactured using the laser using the 3D modeling software based on the STL model of the 3D curved surface, and constructing the STL model of the pattern to be manufactured using the laser, introducing the STL model of the pattern to be manufactured into the laser device, and setting parameters of the laser device; turning on the laser device, and running the 3D dynamic focus system; repeating the foregoing steps to complete the manufacturing of the flexible substrate layer and the flexible functional material layer of the sensor according to the structural design of the sensor; and stripping the sensor from the 3D curved surface for subsequent steps after the flexible substrate layer and the flexible functional material layer of the sensor are complete. The present disclosure directly performs laser processing on the 3D curved surface for attaching to the sensor through the laser 3D dynamic focus system, and the conformal manufacturing of the sensor is achieved in a real sense to be perfectly attached to the curved surface to be attached to the sensor instead of processing splice forming of the 3D curved surface after the 2D plane manufacturing is processed. The present disclosure greatly improves the processing efficiency. Moreover, the method of the present disclosure does not require secondary splicing steps or transfer printing to greatly improve precision of the processing.

The present disclosure uses the 3D modeling software to construct the model of the curved surface through reverse engineering to achieve the modeling of any complex surface without limitation from the curvature of the curved surface, and the applicability of the manufacturing method is greatly improved.

DETAILED DESCRIPTION OF THE EMBODIMENTS

The present disclosure will be further described below in combination with the FIGS. 1-5 and embodiments.

Some sensors need to be well attached to a section to be monitored when the sensors are used to monitor data. However, when the section to be monitored is a 3D curved surface, the sensors cannot be well attached. The present disclosure provides a manufacturing method to enable a flexible sensor to be manufactured to be perfectly attached to the 3D curved surface. The manufacturing method is not limited by a curvature of the 3D curved surface for attaching to the sensor. Moreover, the manufacturing method is not a method in which splice forming of the 3D curved surface is performed after 2D plane manufacturing is processed.

Embodiment 1

Step 1: a curved surface (e.g., a 3D curved surface) to be attached to a sensor (e.g., the flexible sensor) is scanned by a 3D scanner to obtain morphology data of the curved surface to be attached to the sensor, and a Standard Triangle Language (STL) model of the curved surface is constructed.

Figure 1:
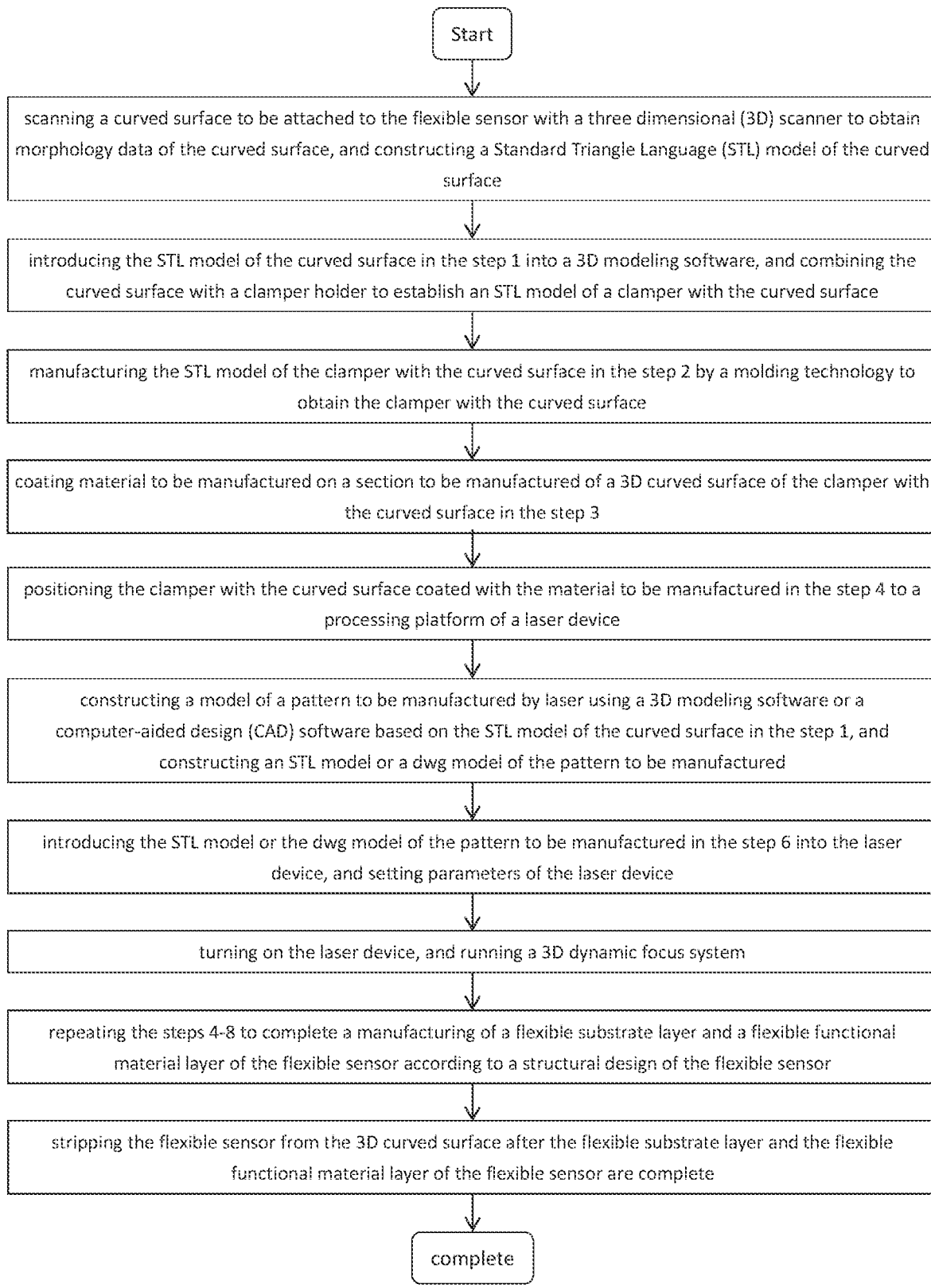
FIG. 1 is a process flow chart of a laser conformal manufacturing method of a flexible sensor.
Figure 2:
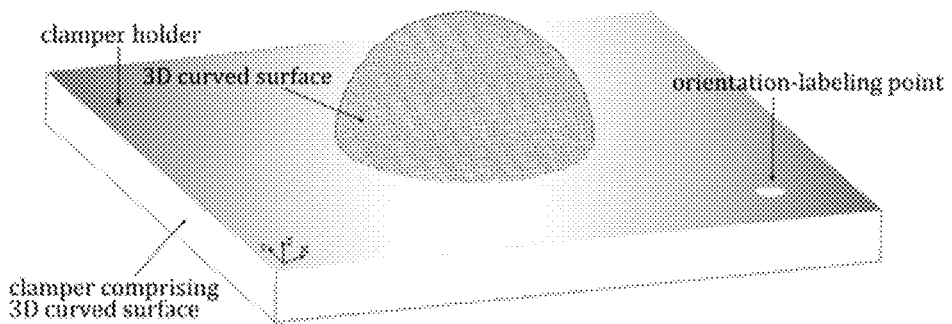
FIG. 2 illustrates a structural view of a combination of the 3D curved surface and a clamper holder.

Step 2: the STL model of the curved surface in the step 1 is introduced into a 3D modeling software, the curved surface to be attached to the sensor is combined with a clamper holder, and an STL model of a clamper comprising the curved surface is constructed, as shown in FIG. 2.

The STL model is constructed using the 3D modeling software, which may be, for example, Pro/E, Solidworks, 3DMax, or UG. The 3D curved surface to be attached to the sensor is placed above the clamper holder, and a section to be manufactured of the 3D curved surface to be attached to the sensor faces upward to establish a connection structure, so that the 3D curved surface to be attached to the sensor and the clamper holder are combined to form an integral member.

Step 3: the STL model of the clamper comprising the curved surface obtained in the step 2 is manufactured by a rapid molding technology to obtain the clamper comprising the curved surface.

The rapid molding technology is a 3D printing (3DP) technology, a fused deposition modeling (FDM) technology, a stereo lithography appearance (SLA) technology, a selective laser sintering (SLS) technology, a digital light processing (DLP) technology, or an ultraviolet (UV) molding technology, but the rapid molding technology is not limited to thereto.

Step 4: a section to be manufactured of a 3D curved surface of the clamper comprising the curved surface in the step 3 is coated with a material to be manufactured.

Figure 3:
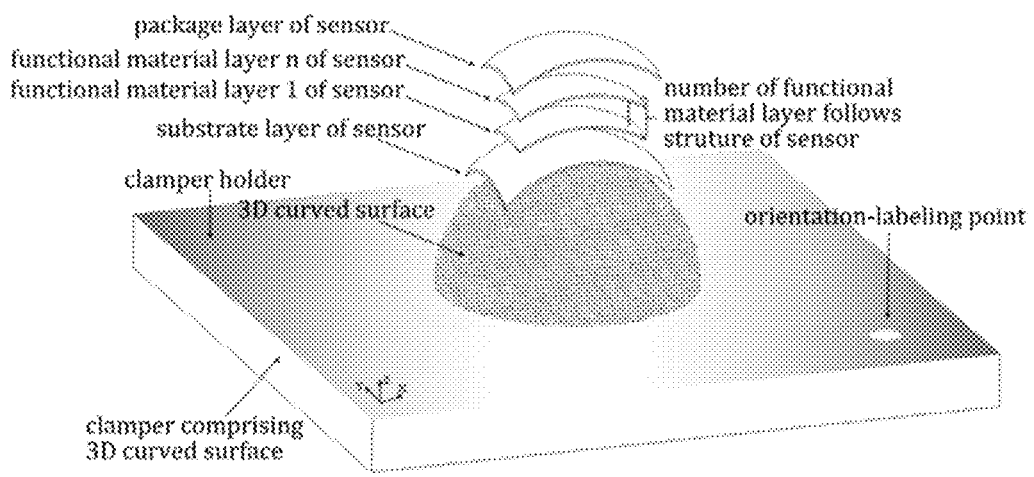
FIG. 3 illustrates an exploded view of a sensor structure manufactured by the laser conformal manufacturing method on the 3D curved surface and the clamper holder.

The material to be manufactured is a nanomaterial or a composite material to function as a substrate layer (e.g., a flexible substrate layer) and a functional material layer (e.g., a flexible functional material layer) of the sensor. The material to be manufactured is coated on the 3D curved surface, and a curvature of a solidified shape of the material is consistent with the 3D curved surface, thereby realizing a structural conformation of the sensor, as shown in FIG. 3. The substrate layer can comprise a release component, which can be, for example, alcohol, stearyl acid, etc., result in an easy peeling of the sensor.

A number of layers of the flexible functional material layer can be more than 1 layer, and an actual number of the layers relates to a structural design of the sensor.

The nanomaterial is a carbon-based material, a quantum dot material, transition metal carbide/nitride (MXene), a perovskite material, fullerene, metal-organic framework (MOF), a metal nanomaterial, etc. The composite material is a high molecular weight polymer such as polydimethyl siloxane (PDMS), polymethyl methacrylate (PMMA), silicone rubber (e.g., Ecoflex), polycarbonate (PC), etc., but the composite material is not limited to the foregoing materials. A coating method for coating the material to be manufactured is an immersion coating method, a brush coating method, a spray coating method, etc., but the coating method not limited to the foregoing methods.

Step 5: the clamper comprising the curved surface that is coated with the material to be manufactured in the step 4 is positioned on a processing platform of a laser device to ensure a positioning precision in the X, Y, and Z directions.

The clamper comprising the curved surface has orientation-labeling points as shown in FIG. 2.

Step 6: a model of a pattern to be manufactured using a laser is constructed by the 3D modeling software or a computer-aided design (CAD) software based on the STL model of the curved surface in the step 1, and an STL model or a dwg model of the pattern to be manufactured is constructed. At the same time, a focal length H between the STL model or the dwg model and the laser is calculated according to the model of the pattern to be manufactured using the laser.

Figure 4:
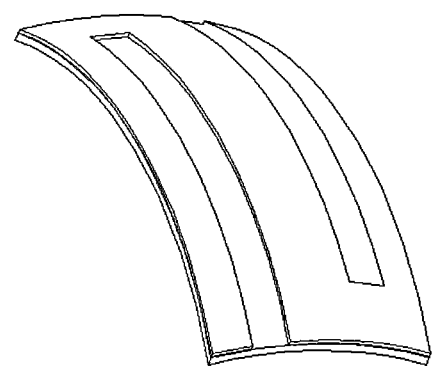
FIG. 4 illustrates a 3D surface pattern model manufactured by the laser conformal manufacturing method.
Figure 5:
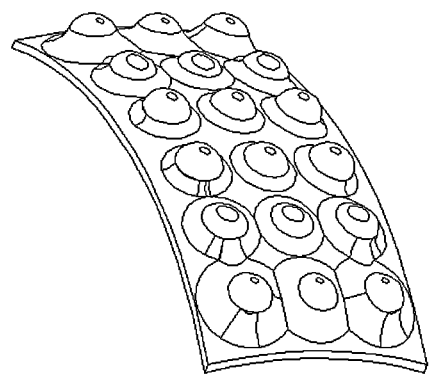
FIG. 5 illustrates a 3D stereo pattern model manufactured by the laser conformal manufacturing method.

The STL model of the pattern to be manufactured can be a 3D surface pattern or a 3D stereo pattern, as shown in FIGS. 4 and 5. A curvature of the pattern to be manufactured is consistent with the 3D curved surface to be attached to the sensor to achieve a laser conformal manufacturing of the pattern.

Step 7: the STL model or the dwg model of the pattern to be manufactured in the step 6 is introduced into a laser device, and parameters such as the focal length H, a laser power, a frequency, a speed, a scanning path, and precision are set;

The laser device comprises parts such as a laser, a vibration mirror, and a beam expander;

The laser is an infrared fiber laser with a wavelength of 1064 nm, but the laser is not limited to the infrared fiber laser. The laser power is 20 W, and a range of the laser frequency is 100 kHz-1000 kHz, but the laser power and the range of the laser frequency are not limited to the foregoing parameters.

The vibration mirror is a 3D dynamic focus vibration mirror.

A focus positive state is that a focal length of the 3D dynamic focus vibration mirror changes according to a distance from a surface of an object to be manufactured to the 3D dynamic focus vibration mirror, thereby controlling focuses of the 3D dynamic focus vibration to all fall on the surface of the object to be manufactured, and focus positive manufacturing in different paths is achieved.

Step 8: the laser device is turned on, and a 3D dynamic focus system of the 3D dynamic focus vibration mirror runs to ensure that all manufacturing paths are in the focus positive state.

Step 9: the steps 4-8 are repeated according to a structural design of the sensor, and manufacturing of the flexible substrate layer and the flexible functional material layer are complete.

Step 10: after the manufacturing of the flexible substrate layer and the flexible functional material layer of the sensor are complete, the sensor is stripped from the 3D curved surface for subsequent steps.

In the laser conformal manufacturing method of the 3D curved surface, an actual curved surface is consistent with the model to be manufactured in a laser system, so that an in-situ attaching state of the sensor on the 3D curved surface is guaranteed.

The laser conformal manufacturing method of the 3D curved surface for the flexible sensor of the present disclosure comprises: obtaining the morphology data of the curved surface to be attached to the sensor (i.e., 3D curved surface to be manufactured), and constructing the STL model of the 3D curved surface; introducing the STL model of the 3D curved surface into the 3D modeling software, and combining the 3D curved surface to the clamper holder to establish the STL model of the clamper; manufacturing the STL model of the clamper by the rapid molding technology to obtain the clamper with the curved surface; coating material to be manufactured on a 3D curved surface section to be manufactured of the clamper; positioning the clamper coated with the material to be manufactured to the processing platform of the laser device; constructing the model of the pattern (e.g., a CAD model or an STL model) to be manufactured using the laser using the 3D modeling software based on the STL model of the 3D curved surface, and constructing the STL model of the pattern to be manufactured using the laser, introducing the STL model of the pattern to be manufactured into the laser device, and setting parameters of the laser device; turning on the laser device, and running the 3D dynamic focus system; repeating the foregoing steps to complete the manufacturing of the flexible substrate layer and the flexible functional material layer of the sensor according to the structural design of the sensor; and stripping the sensor from the 3D curved surface for subsequent steps after the flexible substrate layer and the flexible functional material layer of the sensor are complete. The present disclosure directly performs laser processing on the 3D curved surface for attaching to the sensor through the laser 3D dynamic focus system, and the conformal manufacturing of the sensor is achieved in a real sense to be perfectly attached to the curved surface to be attached to the sensor instead of processing splice forming of the 3D curved surface after the 2D plane manufacturing is processed. The present disclosure greatly improves the processing efficiency. Moreover, the method of the present disclosure does not require secondary splicing steps or transfer printing to greatly improve precision of the processing.

The present disclosure uses the 3D modeling software to construct the model of the curved surface through reverse engineering to achieve the modeling of any complex surface without limitation from the curvature of the curved surface, and the applicability of the manufacturing method is greatly improved.

The aforementioned embodiments are merely some embodiments of the aroma diffuser of the present disclosure, and the scope of the disclosure is not limited thereto. Thus, it is intended that the present disclosure cover any equivalent replacements such as modifications, substitutes, combinations, simplification, and variations of the presently presented embodiments provided they are made without departing from the appended claims and the specification of the present disclosure.

What is claimed is:

1. A laser conformal manufacturing method of a three dimensional (3D) surface of a flexible sensor, comprising:
    step 1: scanning a curved surface to be attached to the flexible sensor with a 3D scanner to obtain morphology data of the curved surface to be attached to the flexible sensor, and constructing a Standard Triangle Language (STL) model of the curved surface to be attached to the flexible sensor;
    step 2: introducing the STL model of the curved surface to be attached to the flexible sensor in the step 1 into a 3D modeling software, and combining the curved surface to be attached to the flexible sensor with a clamper holder to establish an STL model of a clamper with the curved surface;
    step 3: manufacturing the STL model of the clamper with the curved surface in the step 2 by a rapid molding technology to obtain the clamper with the curved surface;
    step 4: coating material to be manufactured on a section to be manufactured of a 3D curved surface of the clamper with the curved surface in the step 3;
    step 5: positioning the clamper with the curved surface coated with the material to be manufactured in the step 4 to a processing platform of a laser device;
    step 6: constructing a model of a pattern to be manufactured by laser using a 3D modeling software or a computer-aided design (CAD) software based on the STL model of the curved surface to be attached to the flexible sensor in the step 1, and constructing an STL model or a dwg model of the pattern to be manufactured;
    step 7: introducing the STL model or the dwg model of the pattern in the step 6 into the laser device, and setting parameters;
    step 8: turning on the laser device, running a 3D dynamic focus system on the laser device, and causing the laser device to create a portion of at least one of a flexible substrate layer or a flexible functional material layer according to the STL model or the dwg model of the pattern;
    step 9: repeating the steps 4-8 to complete a manufacturing of the flexible substrate layer and the flexible functional material layer of the flexible sensor according to a structural design of the flexible sensor; and
    step 10: stripping the flexible sensor from the 3D curved surface after the flexible substrate layer and the flexible functional material layer of the flexible sensor are complete.

2. The method according to claim 1, wherein the combining the curved surface to the clamper holder to establish the STL model of the clamper with the curved surface in the step 2 comprises placing the 3D curved surface above the clamper holder, enabling the section to be manufactured of the 3D curved surface to face upward, and constructing a connection structure to enable the 3D curved surface and the clamper holder to define an integral structure.

3. The method according to claim 1, wherein the rapid molding technology in the step 3 is a 3D printing (3DP) technology, a fused deposition modeling (FDM) technology, a stereo lithography appearance (SLA) technology, a selective laser sintering (SLS) technology, a digital light processing (DLP) technology, or an ultraviolet (UV) molding technology.

4. The method according to claim 1, wherein:
    the material to be manufactured in the step 4 is a nanomaterial or a composite material and functions as the flexible substrate layer and the flexible functional material layer of the flexible sensor, and
    a coating method for coating the material to be manufactured is an immersion coating method, a brush coating method, or a spray coating method.

5. The method according to claim 4, wherein a number of layers of the flexible functional material layer is more than 1.

6. The method according to claim 4, wherein:
    the nanomaterial is a carbon-based material, a quantum dot material, transition metal carbide/nitride (MXene), a perovskite material, fullerene, metal-organic framework (MOF), or a metal nanomaterial, and
    the composite material comprises polydimethyl siloxane (PDMS), polymethyl methacrylate (PMMA), silicone rubber, or polycarbonate (PC).

7. The method according to claim 1, wherein the clamper with the curved surface in the step 5 has an orientation-labeling point.

8. The method according to claim 1, wherein:
    the STL model or the dwg model of the pattern to be manufactured in the step 6 is a 3D surface pattern or a 3D stereo pattern, and
    a curvature of the pattern to be manufactured is consistent with the 3D curved surface to achieve laser conformal manufacturing of the pattern to be manufactured.

9. The method according to claim 1, wherein the laser device in the step 7 comprises a laser, a 3D dynamic focus vibration mirror, and a beam expander.

10. The method according to claim 9, comprising wherein:
    adjusting a focal length of the 3D dynamic focus vibration mirror according to a distance from an object surface to be manufactured to the 3D dynamic focus vibration mirror, thereby controlling focuses of the 3D dynamic focus vibration mirror to all fall on the object surface to be manufactured to achieve focus positive manufacturing in different paths by changing the focal length of the 3D dynamic focus vibration mirror.

* * * * *